United States Patent
Di Milia et al.

[15] 3,689,747
[45] Sept. 5, 1972

[54] DIGITAL EVAPORATION MONITOR SYSTEM

[72] Inventors: Vincent Di Milia, Tarrytown; Arnold Halperin, Peekskill; Morris A. Koblenz, Mahopac, all of N.Y.

[73] Assignee: International Business Machines Corporation, Armonk, N.Y.

[22] Filed: Dec. 9, 1970

[21] Appl. No.: 96,377

[52] U.S. Cl. ..................235/151.3, 118/7, 118/9, 118/10, 118/11, 324/78 D, 324/78 Z, 324/79 D
[51] Int. Cl. .......G01b 7/06, G01r 23/10, H03d 13/00
[58] Field of Search .......118/7, 9, 10, 11; 235/151.3; 324/78 D, 78 Z, 79 D

[56] References Cited

UNITED STATES PATENTS 3,227,952    1/1966    Proefster et al.........118/9 UX

*Primary Examiner*—Eugene G. Botz
*Assistant Examiner*—Stephen R. Dildine, Jr.
*Attorney*—Hanifin & Jancin and John A. Jordan

[57] ABSTRACT

The thickness and rate of evaporation are determined by digitally monitoring the change in frequency effected by the increasing thickness of deposited evaporation on the monitor crystal of the monitor oscillator in the evaporation stream. A preset digital count is loaded into a counter arrangement and the frequency count on the monitor oscillator, taken over a fixed interval of time, is added to the present count to thereby provide a combined count. The combined count is transferred to a storage register and thereafter successive samples of the frequency count on the monitor oscillator are compared to the combined count in the storage register to provide successive difference counts, indicative of evaporation thickness. An up-down counter arrangement is employed to determine evaporation rate by first running up the count on the up-down counter, in response to a sample of the frequency count on the monitor oscillator, taken over a fixed interval of time and then, a fixed time thereafter, running down the count on the up-down counter, in response to a sample of the frequency count of the monitor oscillator, taken over the same fixed interval of time used to run the count up.

11 Claims, 1 Drawing Figure

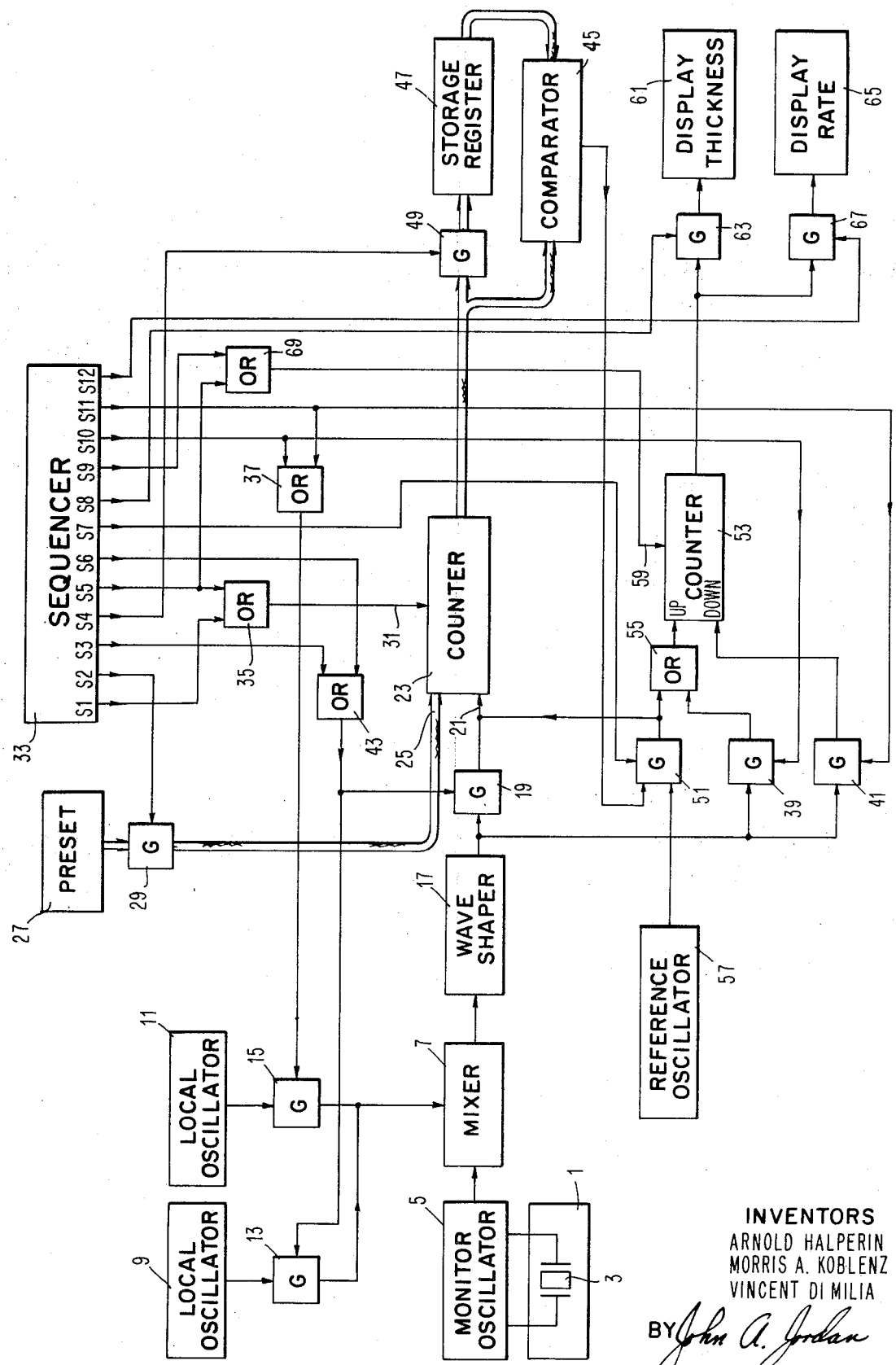

DIGITAL EVAPORATION MONITOR SYSTEM

BACKGROUND OF THE INVENTION

The present invention relates to a digital evaporation monitor and, in particular, to a method and apparatus for measuring and controlling the rate of formation, and thickness of, films of deposited vapor.

The utilization of evaporation apparatus and methods finds widespread application in the fabrication of electronic apparatus and systems, for example. One of the more significant aspects of employing evaporation techniques involves the ability to closely control and measure the amount of evaporation so that the resulting electronic devices, for example, produced thereby are useful, reliable and themselves effective and accurate in operation.

Monitoring methods and apparatus for measuring and controlling the rate, degree and thickness of the mass of material that is deposited on a substrate, for example, during evaporation, are well known in the art. One well known technique involves subjecting the crystal of a crystal oscillator arrangement to the evaporation stream in the evaporation chamber. As the mass of material deposited upon the monitor crystal increases to thereby increase the mass load thereupon, the natural resonance frequency of the crystal decreases as a function thereof. Exemplary of such apparatus is that described in the patent to Steckelmacher et al., U.S. Pat. No. 3,382,842 entitled, "Apparatus for Controlling Vapor Deposition in a Vacuum" and the patent to Hirsh, U.S. Pat. No. 2,906,235 entitled, "Frequency Adjustment Plating Control." The Steckelmacher et al and Hirsh arrangements for monitoring and controlling vapor deposition, as well as other known arrangements in the prior art, all operate in analog fashion to provide the desired results.

One of the difficulties of the analog approach involves, for example, the problem addressed by the Steckelmacher et al. patent. Specifically, according to Steckelmacher et al. prior art techniques involve determining the changes in frequency of the monitor oscillator by comparing the frequency of that oscillator with the frequency of a second oscillator, acting as a reference oscillator, to thereby produce a difference signal, i.e., beat frequency, that affords an accurate indication of the small changes that occur in the frequency of the monitoring oscillator, during evaporation deposition. In accordance with such an arrangement a problem is encountered with regard to the reference oscillator. In particular, if a fixed frequency crystal oscillator arrangement is used as the reference oscillator, then, after a few operating runs, the monitoring frequency of the monitor oscillator will have changed due to a build-up of deposited films, on the monitor crystal, and therefore, at the beginning of the next run, the monitor frequency will be sufficiently widely divergent from that of the reference oscillator frequency that the monitor frequency will fail in its effort to produce a satisfactory difference signal. To cope with this problem the monitor crystal can be cleaned or, alternatively, a reference oscillator may be employed whose frequency may be varied. Neither of the latter two solutions is satisfactory, however, since the former involves unnecessary time and expense and the latter involves utilization of an oscillator that is not stable. Stability and accuracy, can be achieved to some extent, when employing the latter approach to the "build-up" problem, but such accuracy and stability are achieved at the cost of additional circuitry and apparatus rendering the device costly and cumbersome, and yet still not satisfactorily productive of the desired degree of accuracy required for many fabrication applications.

Accordingly, one of the main problems with the prior art analog approach to monitoring vapor deposition involves the difficulty encountered in achieving a simple and effective arrangement for accurately obtaining evaporation thickness and rate. One of the main reasons for inaccuracy in the prior art analog approach lies in the fact that the analog approach involves direct utilization of the difference in frequency between the monitoring oscillator frequency and the reference oscillator frequency. Accordingly, a difficulty is encountered, for example, when the frequency of either the monitor oscillator or the reference oscillator deviates or drifts from their proper value, since such deviation or drift is immediately reflected in the difference signal directly and continuously employed as the monitor and control output signal. By employing a digital approach, frequency drift, and "build-up," for example, which act to alter the starting frequency, pose no problems.

The digital approach, in accordance with the principles of the present invention, involves merely sampling the frequency count of the monitor oscillator, over a fixed interval of time, and adding this frequency count to a preselected count, indicative of the desired thickness, whereby the combined count is stored. Thereafter, additional samples of the frequency count of the frequency of the monitor oscillator are successively taken over fixed intervals of time and compared with the stored combined count until a compare is made. Thus, it can be seen that the frequency count of the monitor oscillator is compared with its own beginning frequency count, plus a preselected count, to provide a continuous difference therebetween. In accordance with such an arrangement, the reference oscillator is merely employed to provide count for the difference between the stored combined count and the current monitor oscillator frequency count, and, deviations in the frequency thereof do not significantly affect the accuracy of operation. Likewise, long term drifts and deviation in the frequency of the monitor oscillator do not significantly affect the accuracy of operation since, with each new run an updated beginning frequency count is stored for comparison with changes in frequency occuring during the run. Finally, by being able to add a preselected count to the beginning monitor frequency count, precise thicknesses may readily be defined and inputed into the monitoring system to thereby achieve accurate and effective evaporation rates and thicknesses, and thereby control thereof.

It is therefore an object of the present invention to provide an improved evaporation monitor system.

It is a further object of the present invention to provide an improved evaporation monitor system for monitoring and controlling the thickness and rate of evaporation.

It is yet a further object of the present invention to provide an improved evaporation monitor system wherein the resonant frequency of a monitor crystal, forming a part of an oscillator circuit, is altered in accordance with the degree of vapor depositions thereon.

It is yet still a further object of the present invention to provide a digital evaporation monitor system for accurately measuring and controling the thickness and rate of vapor deposition.

It is yet another object of the present invention to provide a digital evaporation monitor system which is highly accurate and stable and which requires a minimum of maintainance and adjustments after each monitor run.

The foregoing and other objects, features and advantages of the invention will be apparent from the following more particular description of a preferred embodiment of the invention, as illustrated in the accompanying drawing.

BRIEF DESCRIPTION OF THE DRAWING

The FIGURE shows a preferred embodiment of the digital evaporation monitor system, in accordance with the principles of the present invention.

DETAILED DESCRIPTION OF THE DRAWING

With reference to the FIGURE an evaporation chamber 1 is depicted housing a monitor crystal 3, which may be, for example, a quartz crystal, upon which vapor deposition occurs. It is clear from the drawing that monitor crystal 3 forms a part of the monitor oscillator 5 oscillating circuit, whereby the natural resonance frequency of the crystal controls the frequency of oscillation of the monitor oscillator. Thus, as the mass of material that is vapor deposited upon crystal 3 increases the natural resonance frequency decreases and, accordingly, the frequency of monitor oscillator 5 decreases. The frequency of the output signal from monitor oscillator 5 is mixed, in mixer 7, with the frequency of the output signals from either local oscillator 9 or local oscillator 11, in accordance with the gating control signals received by the respective gates 13 and 15. In this regard it should be noted that two local oscillators are employed for the purpose of providing one mixing signal having a frequency below the frequency of the monitor oscillator 5 output signal and another mixing signal having a frequency above the frequency of the monitor oscillator 5 output signal. The manner in which said mixing signals operate in the system will become more apparent, hereinafter, with regard to the description of operation.

The frequency difference signal, from mixer 7, is shaped by wave shaper 17 to provide an output pulse therefrom for each cycle of a.c. applied thereto. Wave shaper 17 may be any of a variety of arrangements which operate on either the negative or positive half cycle of the a.c. wave to produce a pulse indicative of the presence of one cycle of a.c. signal. The pulse output from wave shaper 17 is applied to gate 19, and the latter, in turn, is coupled to the input 21 of presetable counter 23. In this regard it should be noted that input 21 to counter 23 is a serial-type input, whereby the serial output pulses from wave shaper 17 are counted in sequential order. Counter 23 may be any of a variety of well known presetable counters. Counter 23 is preset, however, by a parallel input arrangement, depicted by the heavy line, designated 25, in the FIGURE. The preset count, to be entered into counter 23, may be provided by preset device 27, via gate 29. Preset device 27 may be any of a variety of apparatus which will store a preselected count. Accordingly, preset device 27 may be a parallel array of presetable binary switches which act to store the binary count. Thus, preset device 27 may be a parallel array of mechanical switches, for example. Likewise, it is clear that preset device 27 may be any of a variety of commercially available storage registers employing transistors, or the like.

With reference to the above described parallel and serial input to counter 23, it should be clear that the parallel preset count may first be entered into the counter 23 and a serial count thereafter added thereto. Counter 23, it should be noted, is reset to zero, via input 31 through gate 35.

Sequencer 33, it can be seen from the FIGURE, acts to reset counter 23, via OR gate 35, on the first and fifth steps, designated S1 and S5, respectively, of the sequencer operation. With respect to sequencer 33, it can also be seen that the same acts to open gate 15, via OR gate 37, on the S10 and S11 steps of the sequencer operation. In this regard it can further be seen that the S10 and S11 steps of the sequencer operation also act to open gates 39 and 41, respectively. Likewise, sequencer 33 acts to open gate 13, via OR gate 43, on the third and sixth steps, S3 and S6, respectively, of sequencer operation.

The output count of counter 23 is coupled, in parallel, to both comparator 45 and storage register 47, the latter via gate arrangement 49. The output of comparator 45 is coupled to the inhibit input to inhibit gate 51, the latter output of which is coupled to the "up" input of up-down counter 53, via OR gate 55. Reference oscillator 57 is likewise coupled to an input to gate 51. The "up" input to counter 53 acts to run the count thereon up in accordance with the number of serial pulses received thereat, while the "down" input to counter 53 acts to run the count thereon down in accordance with the number of serial input pulses received thereat. Counter 53 may be reset to zero at its input 59, via OR gate 69. The output of the counter 53 is coupled to display rate apparatus 65, via gate 67. Display devices 61 and 65 may be any of a variety of digital display apparatus capable of providing a digital representation of thickness and rate, in accordance with the digital output from counter 53.

The operation of the system, in accordance with the principles of the present invention, will be made clear by reference to a description of a preferred embodiment involving assumed parameter values. Assume, therefore, that monitor oscillator 5 exhibits an oscillator frequency at 4.1 M Hz and local oscillators 9 and 11 exhibit oscillator frequencies of 4.2 M Hz and 3.9 M Hz, respectively. Thus, it is clear that when gate 13 is open mixer 7 provides an output signal having a difference frequency of 100K Hz.

Operation of the system, in accordance with the present invention, commences with initialization of the first step of sequencer 33, shown at the S1 output line of sequencer 33, whereby counter 23 is reset to zero. Thereafter, sequencer 33 opens gate 29 to allow the preset count, in preset count device 27, to be sent, in parallel, to counter 23. The preset count supplied to counter 23 may range anywhere from zero to several hundred K Hz, for example. The selected count is made, it is clear, in accordance with the desired degree of thickness of film to be vapor deposited.

Thus, by way of example it may be desired to have a film thickness represented by a count of 50,000. Accordingly preset count device 27 is set to exhibit a count of 50,000, to be entered in parallel, via gate 29, into counter 23. With counter 23 exhibiting the preset count of 50,000, sequencer 33 acts, via its S3 step, to open gates 13 and 19 for a fixed interval of time such as, for example, 1 second. Thus, the frequency of the output signal from the 4.2 M Hz oscillator 9 is mixed with the frequency of the output signal from the 4.1 M Hz monitor oscillator 5 to provide a 100 K Hz difference frequency signal, of one second duration, at the output of mixer 7. Wave shaper 17 acts to produce a single pulse, for counter 23, for each cycle of the 100 K Hz signal burst. Thus, a count of 100,000 is added to the previously stored preset count of 50,000 to thereby provide a total combined count of 150,000, in counter 23.

With the 150,000 count in counter 23 sequencer 33 then acts, via step number S4, to open gate 49 whereby the 150,000 count, on counter 23 is transferred, in parallel, to storage register 47. In accordance with step number S5 of sequencer 33, counter 23 is reset to zero, via OR gate 35. At this point another one-second interval sample of the difference frequency between monitor oscillator 5 and local oscillator 9 is run into counter 23. To achieve the latter end gates 13 and 19 are opened, via step number S6, of sequencer 33, for one second. If, between the last time a one-second interval sample of signal from monitor oscillator 5 had been taken and the present one-second interval sample has been taken any appreciable deposition has occured on crystal 3, then, it is clear that the frequency will thereby be reduced.

For the purposes of explanation it will be assumed that at this point in time the frequency of monitor oscillator 5 is now at 4.09 M Hz. Accordingly, the difference frequency between the 4.2 M Hz signal, from local oscillator 9, and the 4.09 M Hz signal from monitor oscillator 5 yields a difference signal of 110 K Hz. In response to this one-second 110 K Hz signal, the count on counter 23 is run from zero to 110,000. Since this count does not compare with the 150,000 count in storage register 47, comparator 45 fails to provide an output to the inhibit input, to inhibit gate 51. Accordingly, step number S7 of sequencer 33 acts to open inhibit gate 51 to thereby allow reference pulse oscillator 57 to run up the count in counter 23, via input 21, until the count on counter 23 equals the stored combined count in register 47. The pulse output of oscillator 57 is likewise conveyed via OR gate 55, to up-down counter 53. Thus, the pulses from oscillator 57 runs up the count on counter 53 at the same time that they act to run up the count on counter 23. In this regard it should be noted that counter 53 was reset, via sequencer step number S5, at the same time that counter 23 was reset.

Thus, it can be seen that when gate 51 is opened at S7, counter 53 is at zero count while counter 23 exhibits the sample count obtained during the current one-second sample interval. In the example being described the count on counter 23, when inhibit gate 51 is opened, is 110,000 while the count on counter 53 is zero. The 110,000 count is accordingly run up to the 150,000 count in storage register 47 whereby a compare signal is generated, by comparator 45, to inhibit the operation of gate 51. Thus, the reference oscillator pulses are cut off and the count on counter 53 is the difference count between the combined count stored in storage register 47 and the current 1 second interval sample count, in counter 23. It is clear then, that counter 53, in accordance with the example, exhibits a 40,000 count at this point. Since the preset count entered into preset device 27 was 50,000 and the count in counter 53 at this point in time is 40,000 it is evident that approximately one-fifth of the desired film thickness to be deposited has occurred.

The current count in counter 53 is conveyed to display device 61, via gate 63, in response to step number S8 of sequencer 33. It is clear that any of a variety of arrangements may be employed to provide an indication of thickness. For example, if display apparatus 61 were to include a presetable counter which was preset to a 50,000 count, along with presetable counter 23, then the current count in counter 53 could be compared to this present count, in display apparatus 61, whereby a difference signal, indicative of the amount of vapor film that has been deposited, could thereby be displayed.

After the count in counter 53 has been conveyed to display apparatus 61 step number S9, of sequencer 33, acts to reset this counter to zero, via input 59. Thereafter, step number S10, of sequencer 33, acts to allow the signal from local oscillator 11 to mix with the current signal generated by monitor oscillator 5, whereby the difference signal thereof is allowed to run up the count on counter 53 for 1 second and, then, run down the count on counter 53 for one second. It is clear that the difference in count between the count that is run up and the count that is run down is indicative of the rate of deposition.

Accordingly, to achieve an indication of the rate of vapor deposition step number S10, of sequencer 33, acts to open gates 15 and 39 for a one second interval, for example. The frequency difference signal on the output of mixer 7, being indicative of the difference in frequency between the frequency of the 3.9 M Hz local oscillator 11 signal and the current frequency of the monitor oscillator 5 signal, is shaped by wave shaper 17 and delivered to the "up" input of counter 53, via gates 39 and 55. Thus, where the current frequency of the monitor oscillator is, for example, 4.08 M Hz, the difference signal from mixer 7 would be 180 K Hz, and, accordingly, a count of 180,000 would be run up on counter 53 during the first 1 second interval. If, one second later, when the count on counter 53 is being run down, the current frequency of the monitor oscillator 5 has dropped to 4.07 M Hz, then, it is clear that the difference signal would amount to 170 K Hz. Thus, a 10,000 residual count would remain on counter 53, such count being indicative of the rate of deposition.

It follows that after step number S11, of sequencer 33, acts to open gate 41 thereby allow the count on counter 53 to be run down to a level corresponding to the current frequency of monitor oscillator 5, step number S12, of sequencer 33, acts to open gate 67. Accordingly, the residual count on counter 53, indicative of vapor deposition rate, is transferred to display device 65, whereby a digital representation of the deposition rate may be displayed. It should thus be clear that local oscillator 11 acts to provide a signal with a frequency less than the frequency of the monitor oscillator signal so that the difference signal becomes smaller with time, thereby allowing up-down counter 53 to exhibit a positive residual count between the count run up and the count run down. It should also be clear that, contrary to local oscillator 11, local oscillator 9 provides a signal having a frequency which is greater than the frequency of the signal from monitor oscillator 5 so that the difference signal becomes larger with time thereby allowing this difference signal to approach the combined count stored in storage register 47.

It should be clear that after step number S12, of sequencer 33, that the sequencer returns to step number S5, whereby a new one-second interval sample of the frequency of the output signal from monitor oscillator 5 is taken and compared with the combined count in storage register 47. The various sequencer steps between step number S5 and step number S12 are consecutively repeated until the frequency of the signal from monitor oscillator 5 decreases to a point where the difference frequency, taken over at one-second interval, produces a pulse count in counter 23 corresponding to the combined count stored in storage register 47. Thus, in the example given when the frequency of the signal from monitor oscillator 5 reduces to 40.5 M Hz the difference signal from mixer 7 will act to produce a count of 150,000 in counter 23, which count corresponds to the 150,000 count stored in storage register 47. A compare signal from comparitor 45, at this point, would act to inhibit any pulses from reference oscillator 57 from being passed to up-down 53 and the thickness of the film deposited would correspond to the desired thickness in accordance with the 50,000 count present in preset device 27.

It is clear that control apparatus may be coupled to any of a variety of points in the system, such as, to the output of display device 61, for example, whereby automatic termination of the evaporation process may be effected, in response to the system output signal indicating that the desired degree of film thickness has been achieved. It is also clear that other control apparatus may be employed with the output signals produced by the present system whereby automatic control of the rate of vapor deposition may be achieved. It is, likewise, clear that other automatic apparatus may conveniently be employed in combination with the digital evaporation monitor system, in accordance with the present invention.

While the invention has been particularly shown and described with reference to the preferred embodiments thereof, it will be understood by those skilled in the art that various changes in form and details may be made therein without departing from the spirit and scope of the invention.

What is claimed is:
1. An evaporation monitoring system comprising:
monitor oscillator means including a monitor crystal arranged so that the oscillating frequency of said oscillator means varies in accordance with the amount of vapor deposited upon said crystal;
counting means arranged to count and store digital counts therein with said counting means including means for storing a preselected digital count selected in accordance with the desired amount of vapor to be deposited upon said crystal; and
circuit means coupling said monitor oscillator means to said counting means, said circuit means arranged to combine signals indicative of the initial frequency of said oscillator means with said preselected count in said counting means so as to provide a combined count therein which is the sum of said preselected count and the count of said initial frequency, said circuit means including means for thereafter periodically comparing the frequency count of said oscillator means as it changes in accordance with the amount of vapor deposited upon said crystal, with said combined count so as to thereby provide an indication of the amount of vapor deposited upon said crystal.

2. An evaporation monitoring system comprising:
monitor oscillator means including a monitor crystal which varies the oscillating frequency of said oscillator from an initial frequency in accordance with the amount of vapor deposited thereon;
counting means arranged to store a preselected digital count therein, said count being selected in accordance with the desired amount of vapor to be deposited upon said monitor crystal;
circuit means coupling said monitor oscillator means to said counting means for a preselected interval of time so that the frequency count of the said initial frequency of said monitor oscillator means is combined with the said preselected count in said counting means to provide a combined count which is the sum of said frequency count and said preselected count;
compare circuit means; and
means including said counting means coupled to said compare circuit means to provide for the repetitive comparing of the frequency count of said monitor oscillator means, as it varies from said initial frequency in response to the vapor deposited, with the said combined count until the frequency count of said monitor oscillator means compares with the said combined count.

3. The system as set forth in claim 2 further including, means to indicate the difference count between the frequency count of said monitor oscillator means and said combined count, said difference count being indicative of the thickness of vapor deposited upon said monitor crystal.

4. The system as set forth in claim 3 further including, count means arranged to be incremented in accordance with the prevailing count of the frequency of said monitor oscillator means taken over a set interval of time and, at a preselected time thereafter, to be decremented in accordance with the then prevailing count of the frequency of the said monitor oscillator means taken over said set interval of time.

5. An evaporation monitoring system comprising:
monitor oscillator means including a crystal arranged so that the oscillating frequency of said monitor oscillator means varies from an initial frequency in accordance with the amount of vapor deposited upon said crystal;
counting means arranged to count and store a digital count;
means coupled to said counting means to enter a preselected count therein indicative of the amount of vapor to be deposited upon said crystal;

circuit means coupling said monitor oscillator means to said counting means so as to add the frequency count of the said initial frequency of said monitor oscillator means to the said preselected count in said counting means to provide an initial combined count, and to thereafter compare the frequency count of said monitor oscillator means, as it varies in accordance with the amount of vapor deposited upon said crystal, to said combined count until a compare is reached.

6. In an evaporation monitoring system including a reference oscillator means and a monitor oscillator means, said monitor oscillator means having a crystal which varies the oscillating frequency of said monitor oscillator means accordance with the thickness of evaporation thereon comprising;

presetable counter means having a preselected count therein;

circuit means including means coupled to said monitor oscillator and said presetable counter means to effect the initial sampling of the frequency count on said monitor oscillator means and add the sampled frequency count to said preselected count in said presetable counter means to provide a combined count therein;

compare circuit means;

control means coupled to said circuit means and said compare circuit means to control said circuit means to effect the periodic sampling of the count on said monitor oscillator means, as said frequency count varies in accordance with the thickness of evaporation on said crystal, and to compare in said compare circuit means the said periodic sample of the count with said combined count; and indicator means coupled to indicate the difference between the periodically sampled count on said monitor oscillator means and said combined count, said difference being indicative of the evaporation thickness on said crystal.

7. The system as set forth in claim 6 wherein said indicator means includes means to indicate the rate of evaporation.

8. An evaporation monitoring system comprising;

monitor oscillator means including a crystal arranged so that the oscillating frequency of said oscillator means varies in accordance with the amount of vapor deposited upon said crystal;

presetable counter means;

means coupled to said presetable counter means to preset said presetable counter means to a preselected count, said preselected count being indicative of the desired amount of vapor to be deposited upon said crystal;

control circuit means coupling said monitor oscillator means to said presetable counter means;

means coupled to said control circuit means to cause the initial frequency count on said monitor oscillator means to be added to the preselected count in said presetable counter means to thereby provide a combined count in said presetable counter means;

means including storage means coupled to said presetable counter means to cause the combined count in said presetable counter means to be transferred to said storage means;

compare circuit means coupled to said means including storage means and to said presetable counter means;

further means coupled to said control circuit means for periodically causing the frequency count on said monitor oscillator means, as it varies in accordance with the amount of vapor deposited upon said crystal, to be counted by said presetable counter means and compared with the combined count stored in said storage means; and reference oscillator means coupled to said presetable counter means to add to count to said presetable counter means required to make the frequency count on said monitor oscillator means compare with the combined count stored in said storage means, said added count being related to the amount of vapor deposited upon said crystal.

9. The system as set forth in claim 8 further including up-down counter means coupling both said monitor oscillator means and said reference oscillator means to display means, said up-down counter means acting to provide digital signals to said display means to thereby produce an indication of both thickness and rate of evaporation.

10. The system as set forth in claim 9 wherein said monitor oscillator means includes a local oscillator, a monitor oscillator and a mixer coupled to said local oscillator and to said monitor oscillator, said local oscillator having a frequency greater than the frequency of said monitor oscillator so that the difference frequency from said mixer increases with increases in the amount of vapor deposited upon said crystal during a first phase of operation when the frequency count on said monitor oscillator is being compared to the said combined count in said storage means to thereby provide an indication of the amount of vapor deposited upon said crystal.

11. The system as set forth in claim 10 wherein said monitor oscillator means further includes an additional local oscillator coupled to said mixer, said additional local oscillator having a frequency less than the frequency of said monitor oscillator so that the difference frequency from said mixer decreases with increases in the amount of vapor deposited upon said crystal during a second phase of operation when the frequency count on said monitor oscillator is being added to, and then subtracted from, said up-down counter means over respective fixed intervals of time to thereby provide an indication of the rate at which vapor is being deposited upon said crystal.

* * * * *